(12) United States Patent
Zuo et al.

(10) Patent No.: US 11,834,730 B2
(45) Date of Patent: Dec. 5, 2023

(54) METHOD FOR RECYCLING PLUTONIUM FROM SPENT RADIOACTIVE FUEL

(71) Applicant: CHINA INSTITUTE OF ATOMIC ENERGY, Beijing (CN)

(72) Inventors: Chen Zuo, Beijing (CN); Weifang Zheng, Beijing (CN); Taihong Yan, Beijing (CN)

( * ) Notice: Subject to any disclaimer, the term of this patent is extended or adjusted under 35 U.S.C. 154(b) by 1133 days.

(21) Appl. No.: 16/489,727

(22) PCT Filed: Mar. 22, 2017

(86) PCT No.: PCT/CN2017/077640
§ 371 (c)(1),
(2) Date: Aug. 29, 2019

(87) PCT Pub. No.: WO2018/157424
PCT Pub. Date: Sep. 7, 2018

(65) Prior Publication Data
US 2020/0232067 A1     Jul. 23, 2020

(30) Foreign Application Priority Data
Mar. 2, 2017 (CN) .......................... 201710119081.0

(51) Int. Cl.
*C22B 60/04* (2006.01)
*C01G 56/00* (2006.01)
*C22B 7/00* (2006.01)
*G21C 19/46* (2006.01)

(52) U.S. Cl.
CPC ............ *C22B 60/04* (2013.01); *C01G 56/001* (2013.01); *C01G 56/004* (2013.01); *C22B 7/006* (2013.01); *G21C 19/46* (2013.01)

(58) Field of Classification Search
None
See application file for complete search history.

(56) References Cited

U.S. PATENT DOCUMENTS

2010/0038249 A1*   2/2010   Mizuguchi ............. B01D 17/06
                                                            204/233

FOREIGN PATENT DOCUMENTS

CN           104004928 A   *   8/2014
RU           2009114114 A   *   10/2010

* cited by examiner

*Primary Examiner* — Scott R Kastler
(74) *Attorney, Agent, or Firm* — US-China Intellectual Property Counsel, LLC

(57) ABSTRACT

The present invention relates to a method for recovering plutonium from spent radioactive fuel. In one embodiment, the method comprises steps of extracting tetravalent plutonium from an aqueous solution of the spent radioactive fuel using a first organic solvent comprising tributyl phosphate; reducing tetravalent plutonium to trivalent plutonium by adding to an organic phase a second organic solvent comprising dimethylhydroxylamine; and stripping plutonium into the aqueous phase for recycling by adding an aqueous dilute acid solution into an organic phase. The method can significantly improve the efficiency of recovering plutonium from spent radioactive fuel compared with HAN stripping, and at the same time, can avoid the problems resulting from U(IV) reduction and extraction.

9 Claims, 2 Drawing Sheets

METHOD FOR RECYCLING PLUTONIUM FROM SPENT RADIOACTIVE FUEL

FIELD OF INVENTION

The invention relates to the technical field of nuclear material processing. More particularly, the present invention relates to a method for recovering plutonium from spent radioactive fuel.

BACKGROUND OF INVENTION

Industrial-scale reprocessing of spent radioactive fuel has a history of more than 70 years. Seventeen countries have been engaged in reprocessing. Britain, France, Russia, India, Japan and other countries have successively built and operated commercial reprocessing plants, which are rich in operational experience. Since the 1970s, China began the research of power reactor reprocessing technology. In the new century, with the further development of nuclear power in China, the development of power reactor reprocessing technology in China is gradually entering a period of fast grow. The commissioning of power reactor reprocessing pilot plant has been completed, and the project of commercial reprocessing plant has been planned.

So far, in the reprocessing of radioactive spent fuel, the Purex (Plutonium Uranium Reduction Extraction) process is still the most mature process technology for nuclear fuel reprocessing, considering complexity, safety and waste management. Purex process uses tributyl phosphate (TBP) as extractant, alkane (such as kerosene, n-dodecane) as diluent. According to the difference of extraction properties of different elements in organic solvent and nitric acid system, elements are separated to purify and recover U, Pu and other elements.

In Purex process, in order to recover, purify and concentrate plutonium (Pu), it is necessary to strip plutonium to water phase by using stripping agent. The effect of stripping directly affects the recovery of Pu and the quality of uranium (U) products. Due to the strong radiation field in Purex process, the irradiated organic solvents produce irradiated products with strong coordination with Pu (IV), which makes it difficult for Pu to be completely stripped. However, the un-extracted Pu due to the coordination of the irradiated products will enter the salt-containing liquid in the alkaline washing process of the subsequent solvent recovery, and polymerization, accumulation and precipitation occur therein, in which Pu is difficult to recover, and the disposal cost of the liquid containing Pu is also increased.

In the Pu purification cycle with hydroxylamine (HAN) as stripping agent, the Pu in organic phase cannot be completely stripped during the reprocessing of spent radioactive fuel in UP3 Power Reactor in France. In India, in the process of co-stripping U and Pu with nitric acid, there is also a phenomenon that the Pu in organic phase can not be completely stripped during the reprocessing of spent radioactive fuel in Fast Reactor. Researchers in France and India believe that the organic phase Pu can not be completely stripped during the stripping process, which is caused by dibutyl phosphate (HDBP), the radioactive product of the TBP. Other reports also suggest that HDBP is one of the main factors that prevent the complete stripping of Pu in Purex process. When the MOX-B fuel was reprocessed at the Tokaimura reprocessing plant in Japan, the content of HDBP of several specific processing points in the plutonium triple cycle was measured. The content of HDBP in the organic phase of the washing section of 3A was 45 mg/L, and that in the organic phase of the stripping section of 3B was 100 mg/L. Therefore, although it is very important to strip Pu completely in Purex process, according to the operation experience of foreign reprocessing plants, there remains a serious problem of the negative effects of organic solvent radiolysis products on back extraction.

For the development of the reprocessing technology of radioactive spent fuel in China, the impact of HDBP on plutonium stripping also brings practical problems.

1. Taking the reprocessing plant with an annual capacity of 1000 tons of spent fuel for light water reactor as an example, according to the current Purex process and plutonium purification cycle process, the concentration of plutonium in the organic phase effluent in the stripping process reaches 2-10 g/L or more, and the plutonium loss from treated spent fuel to the organic phase effluent and finally into the spent liquid from alkali washing will reach more than 10 kilograms in one year. At the same time, the cost of waste disposal will increase with the increase of plutonium content in waste liquid from alkali washing. If the concentration of plutonium in the effluent organic phase can be reduced to $10^{-4}$ g/L, this part of plutonium can be almost completely recovered.

2. With the improvement of the economical efficiency of nuclear power, the fuel consumption of nuclear power plant is increased, which will not only increase the total radio activity in Purex process, but also increase the production of Pu, and the percentage of isotopes with higher specific activity of alpha in Pu element will also increase. While the radioactive energy of the alpha ray can be absorbed by the solvent completely, a variety of factors together exacerbate the radiolysis of the solvent, and the effect of the radiolysis product on the plutonium stripping will be more serious.

U(IV) and HAN are the most commonly used reductants in plutonium recovery. For TBP organic phase containing HDBP, it is difficult to achieve high recovery efficiency of Pu compared stripping with HAN. U(IV) as a reductant has better stripping effect for Pu, but there are still some shortcomings as follows:

1. U(IV) is contained in the aqueous phase in stripping process. To recover plutonium, uranium and plutonium must be separated.

2. The effluent organic phase contains U, which makes the solvent reuse process more complicated.

SUMMARY OF INVENTION

In one embodiment, the object of the present invention is to provide a method for recovering plutonium from radioactive spent fuel, which can significantly improve the efficiency of recovering plutonium from spent radioactive fuel with respect to HAN stripping, and at the same time, can avoid the problems resulting from U(IV) reduction and extraction.

To achieve this object, in one embodiment, the present invention provides a method of recovering plutonium from spent radioactive fuel, which successively comprises the following steps:

Extraction: tetravalent plutonium is extracted from an aqueous solution of the spent radioactive fuel using an organic solvent containing tributyl phosphate;

Reduction of plutonium with a reducing reagent: Pu (IV) is reduced to Pu (III) by adding organic solvent containing dimethylhydroxylamine to the organic phase to eliminate the complex formed by Pu (IV) and Dibutyl Phosphate (HDBP);

Stripping: An aqueous dilute acid solution is added into the organic phase so as to strip plutonium into the aqueous phase for recycling.

In one embodiment, the present invention provides a method for recovering plutonium from spent radioactive fuel, wherein in the extracting step, the organic solvent containing tributyl phosphate (TBP) is a mixture of tributyl phosphate and alkanes (alkanes such as kerosene and n-dodecane serve as dilutions).

In one embodiment, the present invention provides a method for recovering plutonium from spent radioactive fuel, wherein in the reduction step of plutonium with a reductant, the organic solvent containing dimethyl hydroxylamine is a mixture of dimethyl hydroxylamine and organic solvent containing tributyl phosphate.

In one embodiment, the present invention provides a method for recovering plutonium from spent radioactive fuel, wherein in the reduction step of plutonium with a reductant, the volume ratio of the organic phase and the organic solvent containing dimethyl hydroxylamine is 1:10-10:1.

In one embodiment, the present invention provides a method for recovering plutonium from spent radioactive fuel, wherein the reaction time of the reduction step of plutonium with a reductant is 0.1-10 minutes.

In one embodiment, the present invention provides a method for recovering plutonium from spent radioactive fuel, wherein in the stripping step, the dilute acid aqueous solution is dilute nitric acid aqueous solution.

In one embodiment, the present invention provides a method for recovering plutonium from spent radioactive fuel, wherein dilute nitric acid aqueous solution also contains methyl hydrazine (MMH) or hydrazine.

In one embodiment, the present invention provides a method for recovering plutonium from spent radioactive fuel, wherein dilute nitric acid aqueous solution contains 0.1-1.0 mol/L nitric acid and 0.05-0.3 mol/L methyl hydrazine or hydrazine.

In one embodiment, the present invention provides a method for recovering plutonium from spent radioactive fuel, wherein in the stripping step the volume ratio of the organic phase to the dilute acid aqueous solution is 1:10-10:1.

In one embodiment, the present invention provides a method for recovering plutonium from spent radioactive fuel, wherein the stripping time is 0.1-10 minutes.

The beneficial effect of the present invention is that the method for recovering plutonium from radioactive spent fuel can significantly improve the efficiency of recovering plutonium from spent radioactive fuel compared with HAN stripping, and at the same time, can avoid the problems resulting from U(IV) reduction and extraction.

DETAILED DESCRIPTION OF THE INVENTION

The specific embodiments of the present invention are further described in combination with the embodiments and the attached drawings, and the concentrations herein are all percentage by volume unless otherwise specified.

Example 1: Effects of Organic Phase Containing DMHAN on Reduction of Pu(IV)

Figure 1:
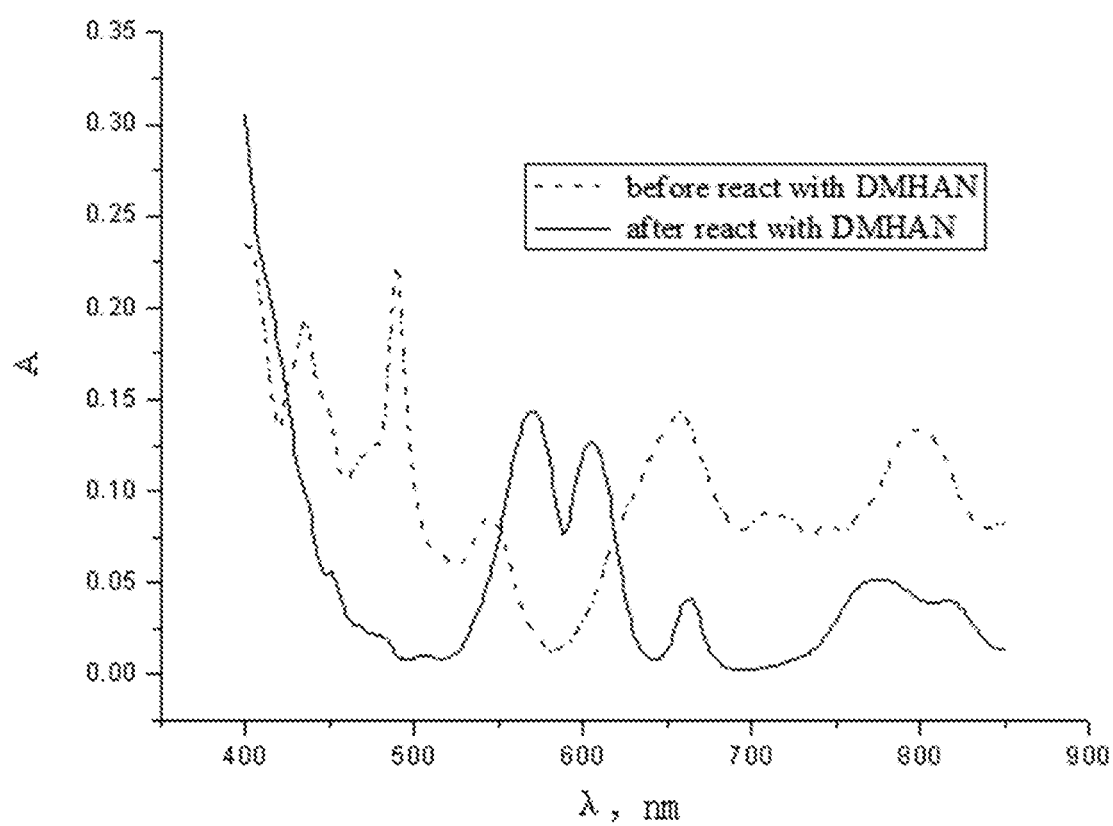
FIG. 1 shows the absorption spectrum of Pu before and after reaction with DMHAN in organic phase.

A solution of 30% TBP/n-dodecane which contained 1.02 g/L Pu was exposed to radiation, receiving an irradiation dose of 1.4 Wh/L, which produced about 100 mg/L HDBP. Absorption peaks in the region of 720 nm and 740 nm appeared, which were characteristics of the Pu(IV)-HDBP complex. Above-mentioned Pu-containing organic phase was thoroughly mixed with the same volume of a 30% TBP solution containing 0.31 mol/L DMHAN, in less than five seconds of mixing, brown Pu(IV) in solution was reduced to blue Pu(III), and after 1 minute of mixing, absorption peaks in the region of 570 and 605 nm appeared, which were the characteristics of Pu(III), and absorption peaks in the region of 720 nm and 740 nm disappeared, which were characteristics of Pu(IV), as shown in FIG. 1. The absorption spectrum results showed that reduction of Pu(IV) by DMHAN in organic solution was complete, even in the presence of HDBP.

For the above TBP organic phase containing HDBP, if Pu was stripped with 0.50 mol/L $HNO_3$ containing HAN, the absorption peaks of Pu (IV)-HDBP complex in the region of 720 nm and 740 nm were almost unchanged, indicating that HAN could not strip Pu(IV)-HDBP complex.

Example 2: Complementary Stripping Test of Pu in Organic Phase

Figure 2:
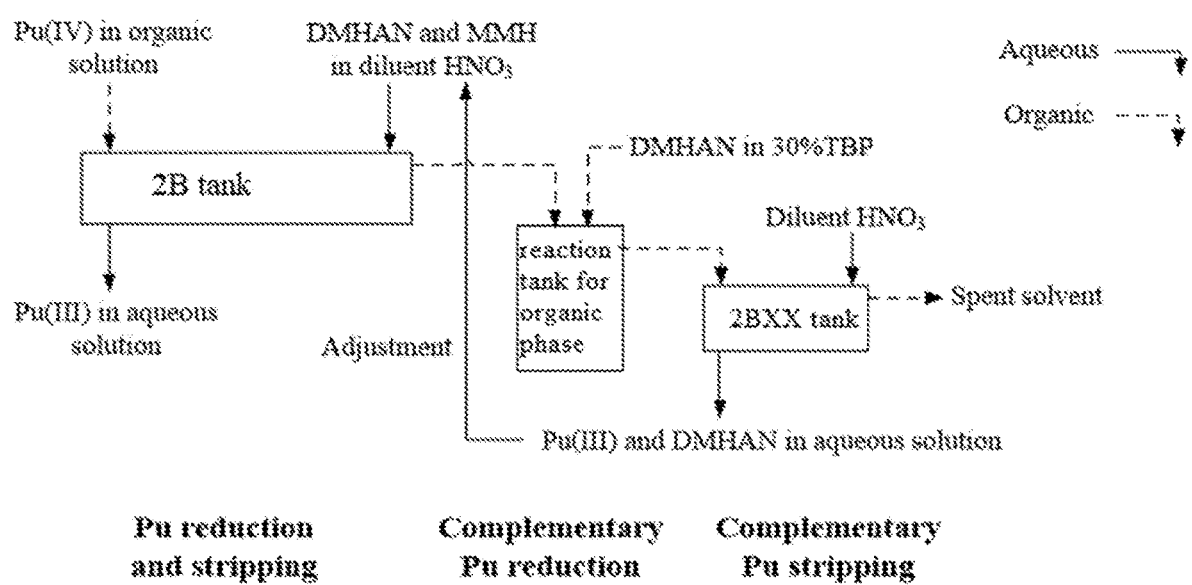
FIG. 2 is an illustrative flowchart of a method for complementary Pu stripping from organic phase.

A complementary stripping test of plutonium in organic phase was designed. The flow chart is shown in FIG. 2.

Most of Pu(IV) was stripped in 2B tank by dilute nitric acid aqueous solution containing DMHAN and MMH, and the concentration of nitric acid and nitrite in organic phase was reduced to avoid adverse effects on the subsequent reaction of DMHAN with Pu(IV) inorganic phase. Due to the low concentration of plutonium in the organic phase in 2B tank, the stripping series of plutonium in 2B cell could be reduced appropriately;

The organic phase with a small amount of Pu (IV) in the 2B tank after stripping entered the organic phase reaction tank and reacted with 30% TBP containing DMHAN. The organic phase after the reaction contained Pu (III) and DMHAN and flowed into the 2BXX tank.

In the 2BXX tank, the dilute nitric acid solution containing MMH was used for multistage stripping of Pu(III) in the organic phase. Pu(III) and DMHAN entered the aqueous phase, and the effluent organic phase was recycled by alkali washing. The aqueous phase in 2BXX tank containing low concentration of Pu(III) and high concentration of DMHAN could be used as stripping agent for 2B tank after proper adjustment.

The 30% TBP/n-dodecane organic phase contained 65.4 g/LU and 16.61 g/L Pu. TBP was exposed to alpha radiation by Pu within the organic phase. After different time, the irradiation doses of TBP were 5.53 Wh/L, 11.1 Wh/L and 25.8 Wh/L, respectively. Pu was stripped by the above process. The content of Pu in the polluted solvent was less than 5 mg/L, and the content of DMHAN was less than $1*10^{-4}$ mol/L.

In contrast, dilute acid containing hydroxylamine was directly used to strip the above-mentioned alpha-irradiated organic phase. The residual concentrations of Pu in the organic phase were 222 mg/L, 346 mg/L and 646 mg/L, respectively.

Example 3: Comparing Different Ways of Recovering Plutonium from Organic Phase

The plutonium-containing organic phase (29% TBP-1% HDBP-0.158 g/LPu-0.250 mol/LHNO$_3$) was prepared and used for plutonium stripping in different ways. The operating conditions and the effects of plutonium stripping are shown in Table 1. As can be seen from Table 1, since the amount of HDBP was much larger than that of plutonium, direct use of HAN for stripping Pu in organic phase had little effect (without reduction of Pu (IV) in organic phase, so the rate of reduction of Pu (IV) in direct stripping process was very slow). Direct use of DMHAN for plutonium stripping was also limited (without reduction of Pu (IV) in organic phase, therefore, although the speed of reducing Pu(IV) in direct stripping was higher than that of direct stripping with HAN, it still can not meet the requirements). The effect of Pu stripping can be significantly improved by using DMHAN to reduce Pu (IV) in organic phase and then carrying out stripping.

Obviously, those skilled in the art can make various changes and variations to the invention without departing from the spirit and scope of the invention. In this way, if these modifications and variations of the invention fall within the scope of the claims of the invention and its equivalent technology, the invention also intends to include these modifications and variations. The above-mentioned embodiments are merely illustrations of the present invention, which can also be implemented in other specific ways or other specific forms without departing from the essence or essential features of the present invention. Therefore, the described embodiments should be considered illustrative rather than restrictive in any way. The scope of the present invention shall be explained by appended claims, and any change equivalent to the intention and scope of the claims shall also be included in the scope of the present invention.

What is claimed is:

1. A method for recovering plutonium from spent radioactive fuel, comprising the following steps:
   (i) extracting tetravalent plutonium from an aqueous solution of the spent radioactive fuel using a first organic solvent comprising tributyl phosphate;
   (ii) reducing tetravalent plutonium to trivalent plutonium by adding to an organic phase a second organic solvent, the second organic solvent is a mixture of dimethylhydroxylamine and organic solvent comprising tributyl phosphate; and
   (iii) stripping plutonimn into the aqueous phase for recycling by adding an aqueous dilute acid solution into an organic phase.

2. A method according to claim 1, wherein the first organic solvent comprising tributyl phosphate is a mixture of tributyl phosphate and alkanes.

3. A method according to claim 1, wherein in step (ii), a volume ratio of the organic phase and the second organic solvent comprising dimethylhydroxylamine is 1:10-10:1.

4. A method according to claim 1, wherein in step (ii), a reaction time of the reduction of plutonium is 0.1-10 minutes.

5. A method according to claim 1, wherein the dilute acid aqueous solution is dilute nitric acid aqueous solution.

6. A method according to claim 5, wherein the dilute nitric acid aqueous solution comprises methyl hydrazine (MMH) or hydrazine.

7. A method according to claim 6, wherein the dilute nitric acid aqueous solution comprises 0.1-1.0 mol/L nitric acid and 0.05-0.3 mol/L methyl hydrazine or hydrazine.

8. A method according to claim 1, wherein in step (iii), a volume ratio of the organic phase to the dilute acid aqueous solution is 1:10-10:1.

9. A method according to claim 1, wherein a stripping time for step (iii) is 0.1-10 minutes.

\* \* \* \* \*

TABLE 1

Comparing different methods for stripping plutonium

| Stripping methods | Concentration of plutonium in organic phase after stripping (g/L) | Specific operating conditions |
|---|---|---|
| Direct stripping using HAN as stripping agent | 0.155 | The organic phase containing plutonium was stripped with 0.1 mol/L HAN-0.5 mol/L nitric acid -0.1 mol/L MMH at a volume ratio of 1:1 for 2 min. |
| Direct stripping using DMHAN as stripping agent | 0.925 | The organic phase containing plutonium was stripped with 0.1 mol/L DMHAN-0.5 mol/L nitric acid-0.1 mol/L MMH at a volume ratio of 1:1 for 2 min. |
| Stripping after reactions in organic phase | $1.82 \times 10^{-2}$ | After the reaction of 30% TBP-0.31 mol/L DMHAN with organic phase containing plutonium at volume ratio 1:1 for 1 min, the organic phase containing plutonium was stripped with 0.1 mol/L HAN-0.5 mol/L nitric acid-0.1 mol/L MMH at volume ratio 1:1 for 1 min. |